United States Patent
Lee et al.

(10) Patent No.: US 10,736,138 B2
(45) Date of Patent: Aug. 4, 2020

(54) METHOD FOR PERFORMING CONTENTION-BASED NON-ORTHOGONAL MULTIPLE ACCESS IN WIRELESS COMMUNICATION SYSTEM, AND DEVICE FOR SAME

(71) Applicant: LG Electronics Inc., Seoul (KR)

(72) Inventors: Hojae Lee, Seoul (KR); Sangrim Lee, Seoul (KR); Dongkyu Kim, Seoul (KR); Kwangseok Noh, Seoul (KR); Myeongjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/337,740

(22) PCT Filed: Mar. 9, 2017

(86) PCT No.: PCT/KR2017/002544
§ 371 (c)(1),
(2) Date: Mar. 28, 2019

(87) PCT Pub. No.: WO2018/062648
PCT Pub. Date: Apr. 5, 2018

(65) Prior Publication Data
US 2019/0349987 A1    Nov. 14, 2019

Related U.S. Application Data

(60) Provisional application No. 62/401,182, filed on Sep. 29, 2016.

(51) Int. Cl.
*H04W 74/08* (2009.01)
*H04L 5/00* (2006.01)
*H04W 4/70* (2018.01)

(52) U.S. Cl.
CPC .......... *H04W 74/08* (2013.01); *H04L 5/0048* (2013.01); *H04W 4/70* (2018.02)

(58) Field of Classification Search
None
See application file for complete search history.

(56) References Cited

U.S. PATENT DOCUMENTS

| 9,768,839 B2* | 9/2017 | Vilaipornsawai | ...... H04B 7/024 |
| 2016/0044652 A1* | 2/2016 | Xue | ...... H04W 56/001 370/329 |

(Continued)

FOREIGN PATENT DOCUMENTS

WO    2015167714 A1    11/2015

OTHER PUBLICATIONS

R1-166095: 3GG TSG RAN WG1 Meeting #86, Gothenburg, Sweden, Aug. 22-26, 2016, Huawei, HiSilicon, "Discussion on grant-free transmission," pp. 1-5.

(Continued)

*Primary Examiner* — Diane L Lo
(74) *Attorney, Agent, or Firm* — Dentons US LLP

(57) ABSTRACT

A method for performing a contention-based non-orthogonal multiple access in a wireless communication system comprises the steps of: selecting a corresponding group from among a plurality of groups for the non-orthogonal multiple access on the basis of a service class of an upper layer; selecting one of a plurality of reference signal sequences and transmitting a reference signal to which the selected reference signal sequence is applied, in a reference signal resource allocated to the selected corresponding group; and transmitting encoded data to which the repetition frequency, corresponding to the selected corresponding group, or a target bit rate is applied.

15 Claims, 9 Drawing Sheets

(56) References Cited

U.S. PATENT DOCUMENTS

| | | |
|---|---|---|
| 2016/0174230 A1 | 6/2016 | Benjebbour et al. |
| 2017/0012754 A1* | 1/2017 | Sun ..................... H04L 5/0048 |
| 2018/0019852 A1* | 1/2018 | Soldati ................. H04L 5/0053 |
| 2018/0160453 A1* | 6/2018 | Lee ...................... H04W 72/04 |
| 2018/0337752 A1* | 11/2018 | Choi ....................... H04B 7/26 |
| 2019/0089498 A1* | 3/2019 | Pelletier ................ H04L 5/003 |

OTHER PUBLICATIONS

R1-167698: 3GPP TSG RAN WG1 Meeting #86, Gothenburg, Sweden, Aug. 22-26, 2016, Intel Corporation, "Grant-less and non-orthogonal UL transmission in NR," pp. 1-5.

R1-167742: 3GPP TSG RAN WG1 Meeting #86, Goteborg, Sweden, Aug. 22-26, 2016, Institute for Information Industry (III), "Discussion on Multiple Access for mMTC," pp. 1-3.

* cited by examiner

METHOD FOR PERFORMING CONTENTION-BASED NON-ORTHOGONAL MULTIPLE ACCESS IN WIRELESS COMMUNICATION SYSTEM, AND DEVICE FOR SAME

This application is a National Stage Entry of International Application No. PCT/KR2017/002544 filed Mar. 9, 2017, which claims priority to U.S. Provisional Application No. 62/401,182 filed Sep. 29, 2016, all of which are incorporated herein by reference.

TECHNICAL FIELD

The present invention relates to wireless communications, and more particularly, to a method of performing a contention-based non-orthogonal multiple access in a wireless communication system and apparatus therefor.

BACKGROUND ART

In a next generation 5G system, a wireless sensor network (WSN), which intermittently transmits a small packet by targeting massive connection/low cost/low power services, massive machine type communication (MTC), etc. are considered. In case of massive MTC service, connection density requirement is very restrictive, whereas data rate and end-to-end (E2E) latency requirement are very free (for example, connection density: up to 200,000/km2, E2E latency: seconds to hours, DUUL data rate: typically 1-100 kbps).

Generally, connection density is determined by the number of UEs that may be supported. However, since a configuration scheme of reference symbols should maintain low cross correlation between sequences, the number of sequences that may be supported at the same time is restrictive. For example, in case of legacy LTE uplink system, demodulation reference signal (DMRS) may include 17 group hopping patterns and 30 sequence shift patterns. Therefore, to support massive connectivity, a reference signal hopping scheme for more connection density support is required. However, a UE grouping scheme and a reference signal hopping scheme of a non-orthogonal multiple access system for massive connectivity support of a next generation 5G system have not been suggested up to now.

DISCLOSURE OF THE INVENTION

Technical Task

One technical task of the present invention is to provide a method of performing a contention-based non-orthogonal multiple access by a user equipment in a wireless communication system.

Another technical task of the present invention is to provide a user equipment performing a contention-based non-orthogonal multiple access in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In one technical aspect of the present invention, provided herein is a method of performing a contention-based non-orthogonal multiple access by a user equipment in a wireless communication system, the method including selecting a corresponding group from a plurality of groups for the non-orthogonal multiple access based on a service class on a higher layer, transmitting a reference signal to which a reference signal sequence selected from a plurality of reference signal sequences is applied on a reference signal resource allocated to the selected corresponding group, and transmitting data encoded in a manner of applying a repetition count or target bit rate corresponding to the selected corresponding group to the data.

The data may be transmitted on a dedicated resource configured for the contention-based non-orthogonal multiple access. The method may further include receiving information indicating matching relationship between service classes on the higher layer and a plurality of the groups. The method may further include receiving information on the dedicated resource configured for the contention-based non-orthogonal multiple access.

The service class may be determined based on a priority of the data on the higher layer.

If the group selected by the user equipment has a priority higher than that of a different group, a data region allocated to the selected group in the dedicated resource may be bigger than a data region allocated to the different group. The data may be transmitted through a data region allocated to the selected group in the dedicated resource. The contention-based non-orthogonal multiple access may include Partially Overlapping Multiple Access (POMA).

In another technical aspect of the present invention, provided herein is a user equipment performing a contention-based non-orthogonal multiple access in a wireless communication system, the user equipment including a processor configured to select a corresponding group from a plurality of groups for the non-orthogonal multiple access based on a service class on a higher layer and a transmitter configured to transmit a reference signal to which a reference signal sequence selected from a plurality of reference signal sequences is applied on a reference signal resource allocated to the selected corresponding group and transmit data encoded in a manner of applying a repetition count or target bit rate corresponding to the selected corresponding group to the data.

The user equipment may further include a receiver configured to receive information indicating matching relationship between service classes on the higher layer and a plurality of the groups. The service class may be determined based on a priority of the data on the higher layer. The transmitter may be configured to transmit the data on a dedicated resource configured for the contention-based non-orthogonal multiple access.

The user equipment may further include a receiver configured to receive information on a dedicated resource configured for the contention-based non-orthogonal multiple access.

If the group selected by the user equipment has a priority higher than that of a different group, a data region allocated to the selected group in the dedicated resource may be bigger than a data region allocated to the different group. The contention-based non-orthogonal multiple access may include Partially Overlapping Multiple Access (POMA).

Advantageous Effects

Accordingly, data transmission can be efficiently performed by reducing control information signaling overhead in an environment (mMTC) having high connectivity according to a contention-based POMA scheme proposed as one embodiment of the present invention.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE FOR INVENTION

Figure 1:
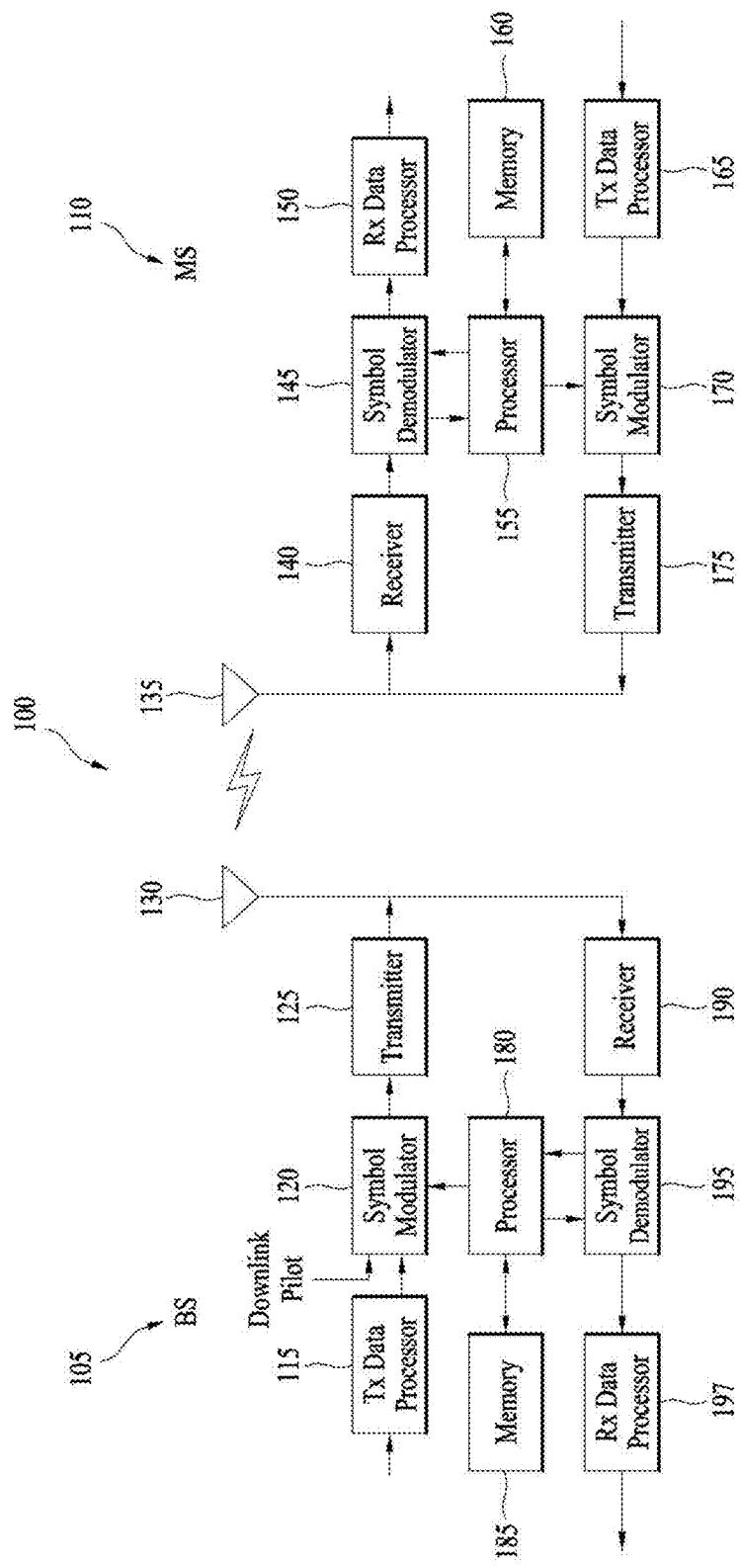
FIG. 1 is a block diagram illustrating a configuration of a base station 105 and a user equipment 110 in a wireless communication system.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105.

The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The present invention suggests a scheme related to user (or UE) grouping and reference signal hopping (RS hopping) of a non-orthogonal multiple access (NOMA) system for supporting massive connectivity.

Figure 2:
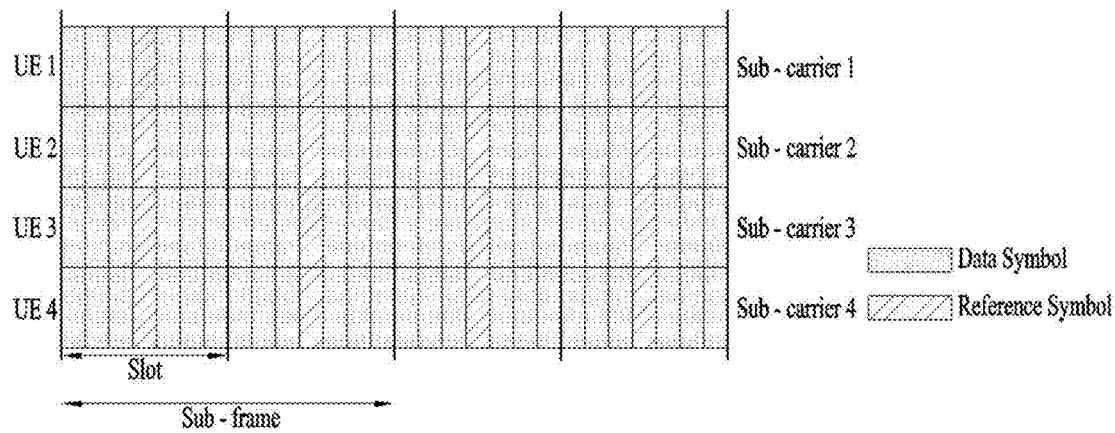
FIG. 2 illustrates a frame structure for uplink support in a long term evolution (LTE)/LTE-Advanced (LTE-A) system.

FIG. 2 illustrates a frame structure for uplink support in a long term evolution (LTE)/LTE-Advanced (LTE-A) system.

In FIG. 2, data symbols may include a PUSCH (Physical Uplink Shared Channel) or a PUCCH (Physical Uplink Control Channel). Reference symbols may include a DMRS, etc. The frame structure of FIG. 2 may be various depending on an environment of the wireless communication system. That is, a structure of subframes, a slot length, and the number of symbols within a slot may be varied. Also, the frame structure may be used for an ad-hoc network such as D2D (Device to Device) UE for performing direct communication between UEs or V2X (Vehicular to Everything) and a cellular based system such as LTE-A and MTC (Machine Type Communication). In the legacy wireless communication system, time-frequency resources may be allocated to a UE, and data symbols and reference symbols may be used differently from each other through usage of orthogonal resources. Therefore, a signal of each UE may be demodulated without interference from another UE.

Figure 3:
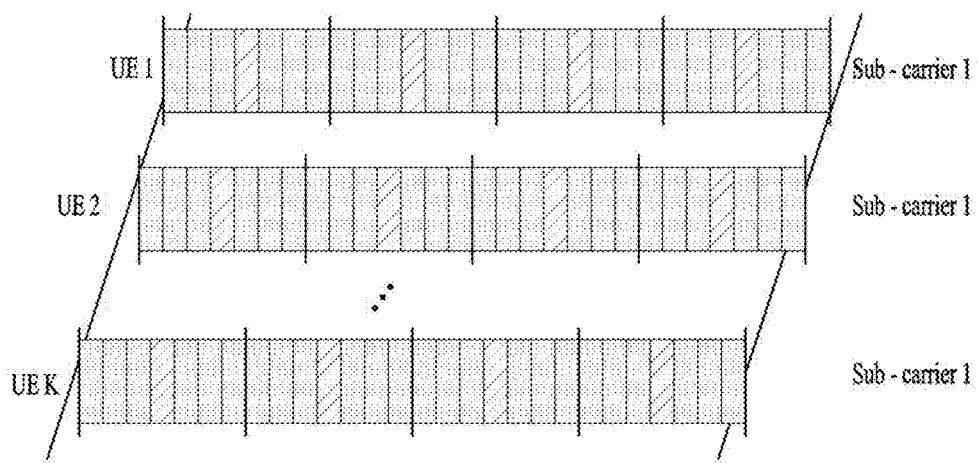
FIG. 3 illustrates a frame structure for a non-orthogonal multiple access system based multi-user data overlapping transmission scheme.

FIG. 3 illustrates a frame structure for a non-orthogonal multiple access system based multi-user data overlapping transmission scheme.

The frame structure of FIG. 3 is the same as that of FIG. 2 except that a plurality of UEs (or users) share the same frequency resource to allocate non-orthogonal time-frequency resources to other UEs (or users). For example, UE K uses the same frequency resource subcarrier 1 (Subcarrier 1) in UE 1 as illustrated in FIG. 3, whereby data symbols are overlapped with the reference symbols.

The reference symbols use auto-correlation and cross-correlation characteristics of sequence for channel coefficient estimation. If low cross-correlation is applied among a plurality of sequences, the receiver may identify the overlapped reference symbols of the plurality of UEs. For example, each UE may configure reference symbols on the basis of Zadoff-Chu sequence which is one of CAZAC sequence and then transmit the reference symbols through overlap. In accordance with the configuration of the sequences, the overlapped reference symbols of a plurality of UEs may be demodulated perfectly, or may be demodulated at very low interference.

Figure 4:
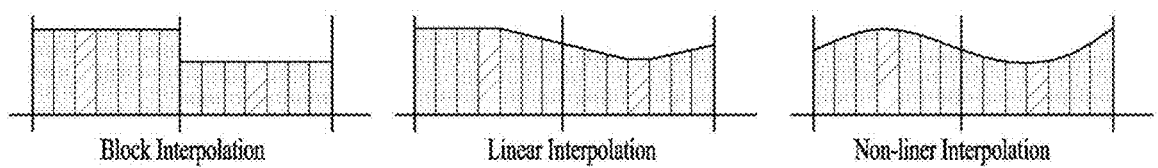
FIG. 4 is an exemplary view illustrating interpolation methods for channel estimation.

FIG. 4 is an exemplary view illustrating interpolation methods for channel estimation.

Channel estimation may be performed for the demodulated reference symbols by interpolation methods as illustrated in FIG. 4. Different interpolation methods may be configured depending on a system environment or coherence time, and may be configured by a frame structure based on a configuration of normal CP (cyclic prefix) or extended CP.

Multiuser detection (MUD) may be performed for the data symbols on the basis of channel estimation according to the reference symbols through a receiver that supports NOMA. For example, Maximum Likelihood (ML) detection or Maximum joint A posteriori Probability (MAP), Codeword Interference Cancellation (CWIC) of Multiuser Superposition Transmission (MUST), Massage Passing Algorithm (MPA) of Sparse Code Multiple Access (SCMA), Parallel Interference Cancellation (PIC) of Interleave Division Multiple Access (IDMA), etc. may be used. MUD scheme of the data symbols may be defined in various manners in accordance with a non-orthogonal multiple access transmission and reception design system.

Since the non-orthogonal multiple access system transmits signals of a plurality of UEs to the same time-frequency resource through by overlapping the signals, the non-orthogonal multiple access system has a higher decoding error rate than the LTE system but may support higher frequency usage efficiency or more connectivity. The non-orthogonal multiple access system may achieve higher frequency usage efficiency or more connectivity while maintaining a decoding error rate through control of a coding rate, in accordance with a system environment.

As described above, the present invention is intended to suggest a UE grouping scheme and a reference signal hopping scheme of a non-orthogonal multiple access system for support of massive connectivity.

Proposed Method 1: Reference Signal Hopping Method for Massive Connectivity

To support massive connectivity, a multiple access system that enables demodulation while supporting a maximum number of sequence based reference symbols or more is required.

Figure 5:
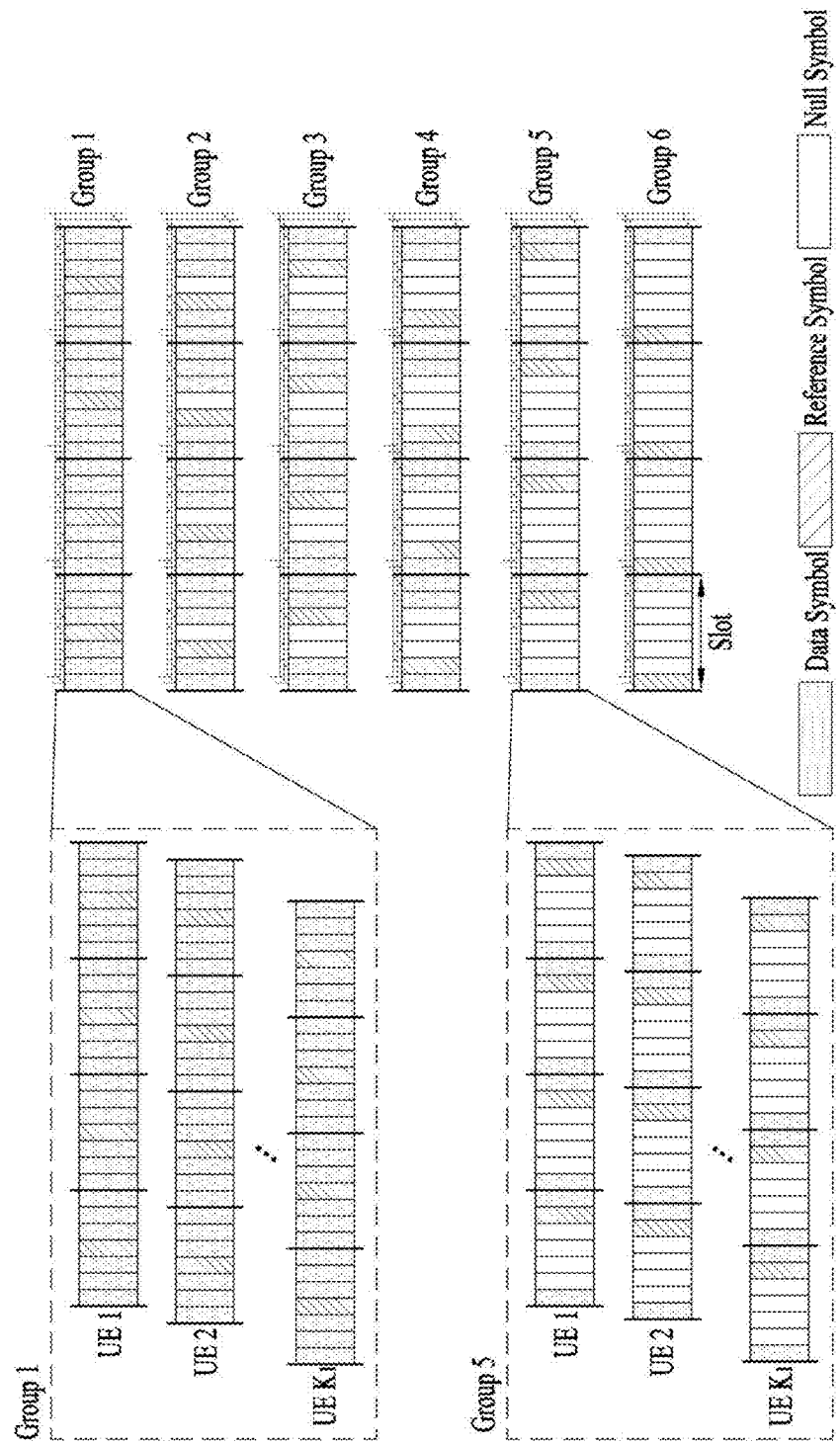
FIG. 5 is an exemplary view illustrating a frame structure of a reference signal hopping based NOMA group.

FIG. 5 is an exemplary view illustrating a frame structure of a reference signal hopping based NOMA group.

To support massive connectivity, a multiple access system that enables demodulation while supporting a maximum number of sequence based reference symbols or more is suggested. FIG. 5 illustrates a frame structure of non-orthogonal multiple access UE groups that share one frequency resource (in this case, UE groups have been determined randomly, and UE grouping method will be described in detail in the embodiment 2).

To support a maximum number of reference symbols or more, each group uses all of a maximum number of reference symbols, and reference symbols of each group are configured to avoid overlap with reference symbols of another group as illustrated in FIG. 5. For convenience of description, 3GPP LTE will be described as an example. The number of maximum UE groups may be supported up to 6 in a normal CP frame structure of FIG. 5, and may be supported up to 5 in an extended CP frame structure. At this time, since it is difficult to demodulate signals if the number of overlapped groups is increased, the number of groups which are used may be varied depending on a system environment or QoS constraint. Also, the number of maximum UEs that may be supported in one group is the same as the number of maximum sequence based reference signals. Since it is difficult to demodulate signals if the number of UEs that perform NOMA in one group is increased, the number of UEs in the same group may be varied depending on a system environment or QoS constraint. Meanwhile, a different code or transmission power may be applied to each of the UEs within the same group, whereby the base station may identify the UEs in the same group. Also, if a different code or transmission power is applied to UEs among different groups, the base station may perform decoding in a state that interference among UEs for a plurality of groups is minimized Since the number of maximum overlaps through the above-described NOMA scheme is more than the number of maximum reference symbols, NOMA service may be supported for a plurality of groups.

For example, in FIG. 5, group 1 corresponds to a group of multiple UEs, which performs NOMA of FIG. 3, and is comprised of K1. MUD performance for group 1 is reduced if the number K1 of users of group 1 is increased, and is increased if K1 is reduced. Also, if group 1 is only used for service, there is no interference to another group, whereby MUD performance is increased. MUD performance is reduced if the number of groups subjected to service is increased.

If reference signal hopping for a plurality of groups in FIG. 5 is performed, demodulation may be performed for reference symbols of group 1 without interference to another group, and should be performed for reference symbols of group 2 in a state that the reference symbols are interfered by data symbols of group 1. That is, reference symbols of a higher group (low order) are not interfered from symbols of a lower group (high order), and reference symbols of a lower group are interfered from symbols of the higher group. For detailed description, received signals for symbols in one slot of FIG. 5 are used as expressed by the following Equation 1.

$$y(1) = \sum_{g=1}^{G-1} \sum_{k=1}^{K_g} h_k^{(g)} d_k^{(g)} + \sum_{k=1}^{K_6} h_k^{(6)} P_k + n_1, \quad \text{[Equation 1]}$$

-continued $$y(2) = \sum_{g=1}^{G-3} \sum_{k=1}^{K_g} h_k^{(g)} d_k^{(g)} + \sum_{k=1}^{K_4} h_k^{(4)} P_k + n_2,$$

$$y(3) = \sum_{g=1}^{G-5} \sum_{k=1}^{K_g} h_k^{(g)} d_k^{(g)} + \sum_{k=1}^{K_2} h_k^{(2)} P_k + n_3,$$

$$y(4) = \sum_{k=1}^{K_1} h_k^{(1)} P_k + n_4,$$

$$y(5) = \sum_{g=1}^{G-4} \sum_{k=1}^{K_g} h_k^{(g)} d_k^{(g)} + \sum_{k=1}^{K_3} h_k^{(3)} P_k + n_5,$$

$$y(6) = \sum_{g=1}^{G-2} \sum_{k=1}^{K_g} h_k^{(g)} d_k^{(g)} + \sum_{k=1}^{K_5} h_k^{(5)} P_k + n_6,$$

$$y(7) = \sum_{g=1}^{G} \sum_{k=1}^{K_g} h_k^{(g)} d_k^{(g)} + n_7.$$

y(m) represents a received signal of the m-th symbol in one slot, and includes a channel $h_k^{(g)}$ from the kth UE of the gth group, data symbol $d_k^{(g)}$, reference symbol Pk, and received noise nm. G is the number of total groups, and Kg represents the number of total UEs in the g-th group. Since the reference symbols Pk used in the respective groups are not overlapped in a reference signal avoidance (or hopping) scheme, the same sequence may be used for the reference symbols Pk.

Then, the fourth symbol y (4) includes reference symbols from the first group UEs. Since a sequence set to have cross correlation of 0 or lower cross correlation if possible is used for the reference symbols of the respective UEs, auto-correlation may be performed using a self-sequence, whereby channel estimation may be performed. At this time, the maximum number of K1 is equal to the maximum number of Pk. Data symbols from the first group UEs of y(3) may be detected based on the estimated channel information as expressed in the following Equation 2. At this time, the MUD scheme may be varied depending on NOMA scheme which is used.

$$\sum_{g=1}^{1} \sum_{k=1}^{K_1} d_k^{(1)} = \frac{y(3)}{\widetilde{h^{(1)}}} = \sum_{g=1}^{1} \sum_{k=1}^{K_1} d_k^{(1)} + \sum_{k=1}^{K_2} \frac{h_k^{(2)}}{\widetilde{h^{(1)}}} P_k + \frac{n_3}{\widetilde{h^{(1)}}} \quad \text{[Equation 2]}$$

In the Equation 2, $\widetilde{h^{(1)}}$ is a channel compensation term for multiple UEs of group 1. The Equation 2 may be changed in accordance with a channel compensation scheme, and a second item in a right hand side of the Equation 2 represents interference based on reference symbols from the second group users, and a third item is a changed noise value.

The third symbol y(3) includes data symbols from the first group UEs and reference symbols from the second group UEs (see Equation 3). Therefore, if the data symbols from the first group UEs are demodulated, interference for the reference symbols of the second group may be removed to perform channel estimation.

$$\sum_{k=1}^{K_2} h_k^{(2)} P_k + n_3 = y(3) - \sum_{g=1}^{1} \sum_{k=1}^{K_1} \widetilde{h_k^{(1)}} \widetilde{d_k^{(1)}} \quad \text{[Equation 3]}$$

In this case, since the data symbols from the first group UEs have been demodulated in a state that they are interfered from the reference symbols of the second group, an error for demodulation may exist. Therefore, the data symbols from the first group UEs may be detected repeatedly by reflecting channel estimation through the reference symbols of the second group. This may be expressed by the following Equation 4.

$$\sum_{g=1}^{1} \sum_{k=1}^{K_1} \widetilde{d_k^{(1)}} + \widetilde{n_3} = y(3) - \sum_{k=1}^{K_2} \widetilde{h_k^{(2)}} P_k \quad \text{[Equation 4]}$$

In this way, iterative demodulation of received signals from y(1) to y(7) may be performed. If an iterative demodulation mode procedure between groups is schematized, the procedure may be expressed by the following Equation 6.

Figure 6:
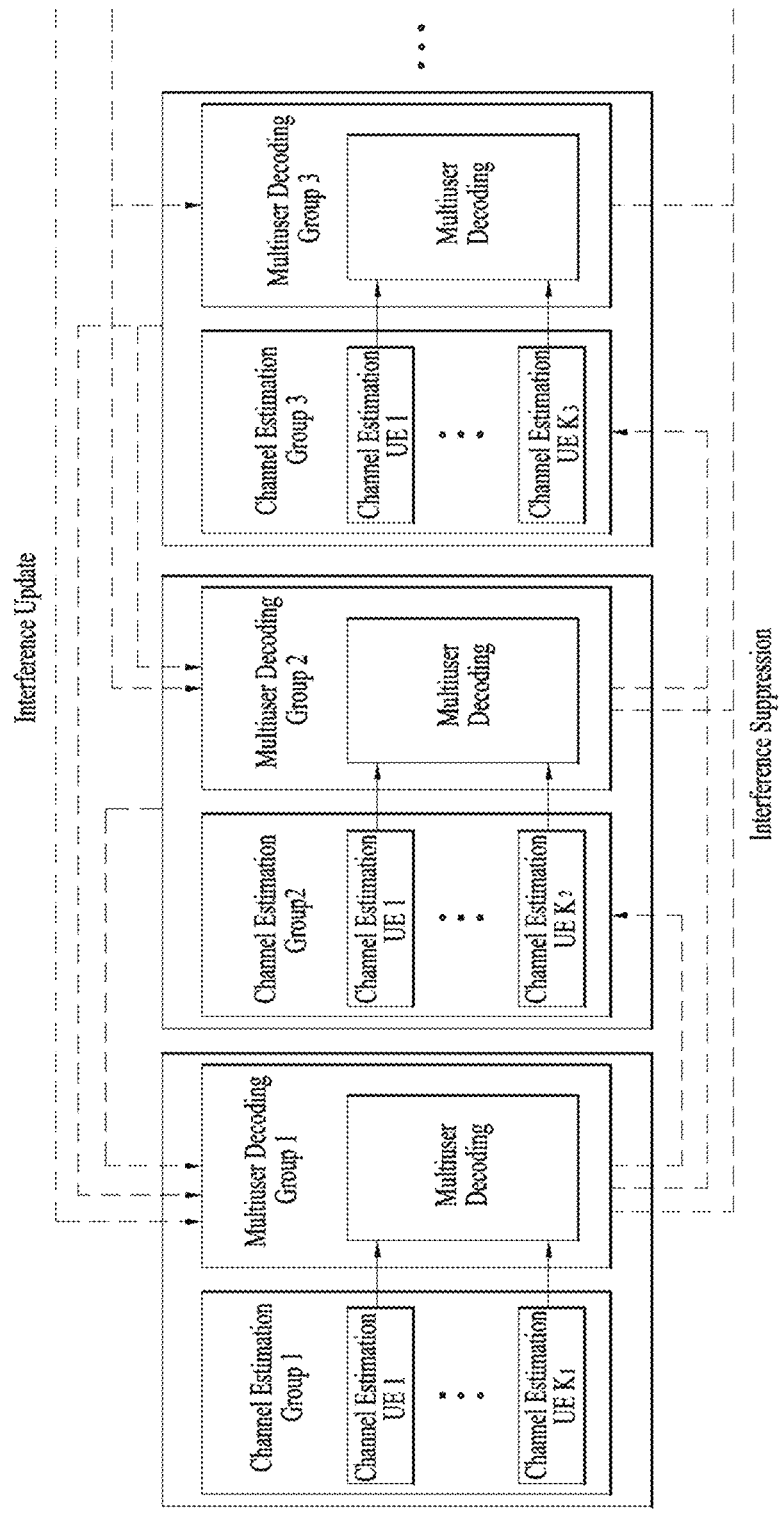
FIG. 6 is a view illustrating a procedure for iterative multi-group detection.

FIG. 6 is a view illustrating a procedure for iterative multi-group detection.

In FIG. 6, the MUD scheme of each group may be defined in various manners through a receiver that supports NOMA. For example, Maximum Likelihood (ML) detection or Maximum joint A posteriori Probability (MAP), Codeword Interference Cancellation (CWIC) of Multiuser Superposition Transmission (MUST), Massage Passing Algorithm (MPA) of Sparse Code Multiple Access (SCMA), Parallel Interference Cancellation (PIC) of Interleave Division Multiple Access (IDMA), etc. may be used. The MUD scheme of data symbols may be defined in various manners in accordance with a non-orthogonal multiple access transmission and reception design scheme.

If the suggested scheme is used, the maximum sequences of the reference signals may be multiplied as much as the number of groups to support massive connectivity. In the above scheme, a reference signal hopping pattern is as follows.

Embodiment 1: Reference Signal Hopping Pattern Based on Normal Cyclic Prefix (CP) Frame Structure FIG. 7 is a view illustrating an example of a normal CP frame structure based reference signal hopping pattern.

Figure 7:
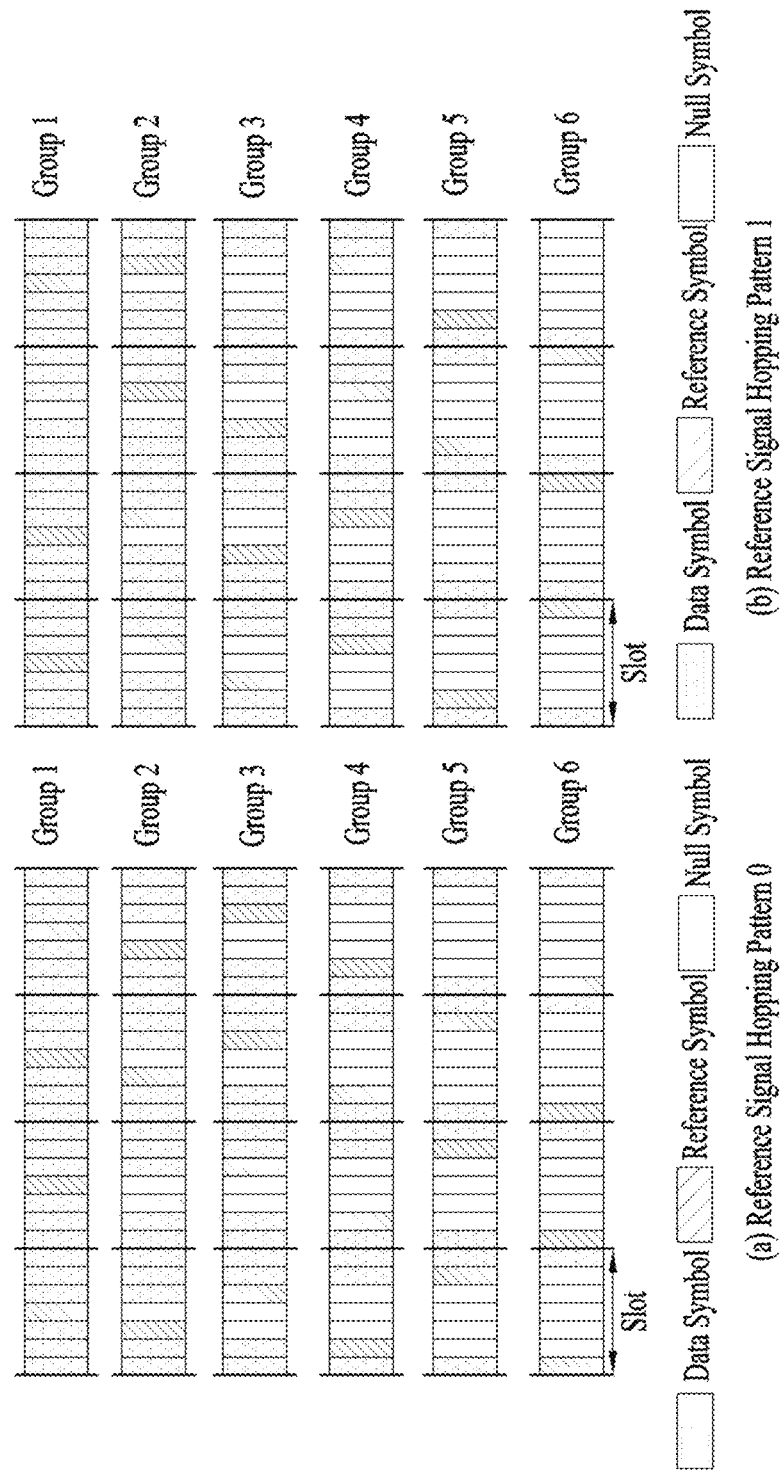
FIG. 7 is a view illustrating an example of a normal CP frame structure based reference signal hopping pattern.

FIG. 7 illustrates reference signal hopping pattern using two subframes. Block, linear and non-linear interpolations of FIG. 4 may be performed for group 1 of FIG. 7 in accordance with a system environment. On the other hand, in case of the other groups, the reference signals are not located at the center of a slot and spaced apart from data symbols, whereby performance of block interpolation may be deteriorated. Therefore, a UE may block degradation of channel estimation performance by performing block interpolation for three symbols at both sides based on the reference symbols. At this time, the UE performs channel estimation beyond slot boundary. For example, in group 4 of a reference signal hopping pattern 0 shown in FIG. 7(*a*), block interpolation is performed for first three symbols (a first symbol of a reference slot and sixth and seventh symbols of a previous slot) based on the reference symbols. Similarly, in group 5, block interpolation is performed for the last two symbols (a seventh symbol of a reference slot and a first symbol of next slot) based on the reference symbols.

Likewise, block interpolation may be applied to the other groups and groups of a reference signal hopping pattern 1 shown in FIG. 7(b). Alternatively, channel estimation performance may be improved through linear interpolation and non-linear interpolation.

The embodiment 1 is an example of the reference signal hopping pattern, and corresponds to another pattern that uses all of the maximum number of reference symbols in each group while allowing the reference symbols not to be overlapped, in another way.

Embodiment 2: Reference Signal Hopping Pattern Based on Extended CP Frame Structure FIG. 8 is a view illustrating an example of an extended CP frame structure based reference signal hopping pattern.

Figure 8:
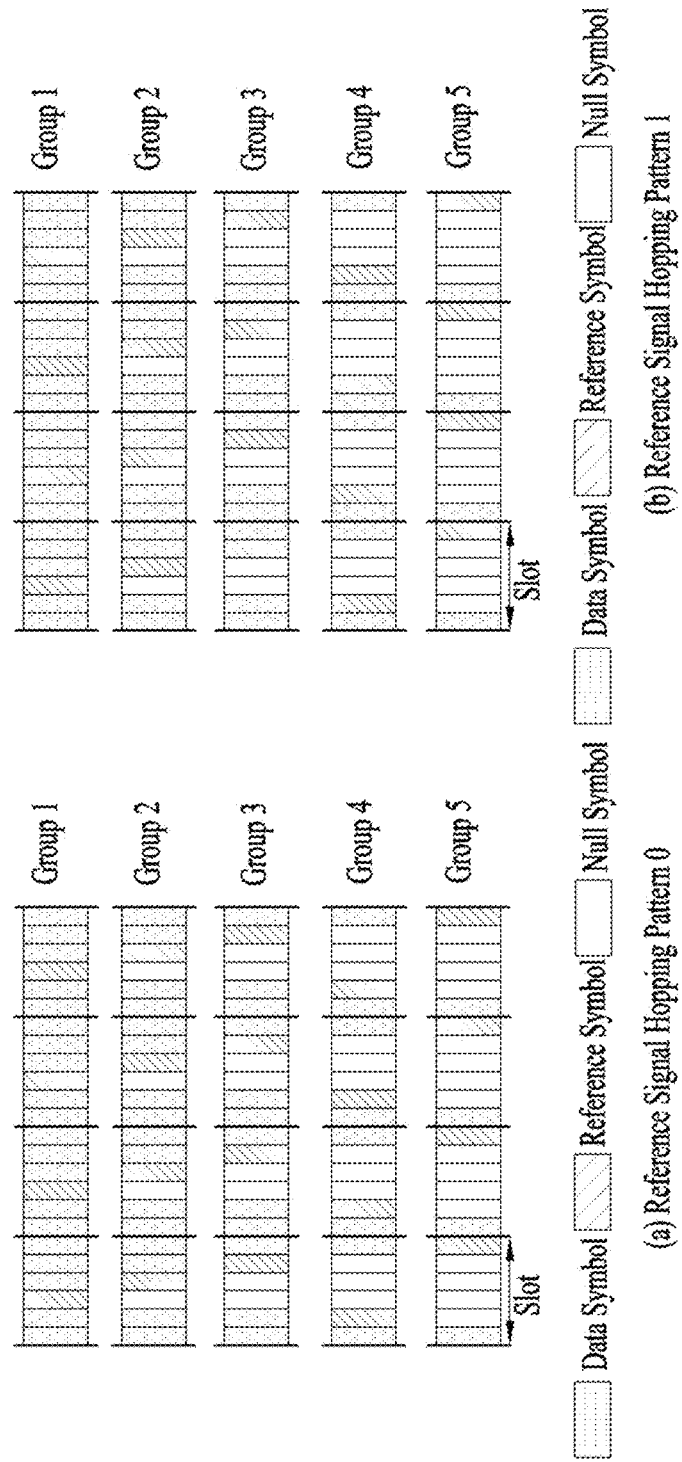
FIG. 8 is a view illustrating an example of an extended CP frame structure based reference signal hopping pattern.

FIG. 8 illustrates reference signal hopping pattern using two subframes. Block, linear and non-linear interpolations of FIG. 4 may be performed for groups 1 and 2 of FIG. 8 in accordance with a system environment. On the other hand, in case of the other groups, the reference signals are not located at the center of a slot and spaced apart from data symbols, whereby performance of block interpolation may be deteriorated. Therefore, a UE may block degradation of channel estimation performance by performing block interpolation for two symbols at a left side and three symbols at a right side based on the reference symbols. At this time, the UE performs channel estimation beyond slot boundary.

For example, in group 3 of a reference signal hopping pattern 0 shown in FIG. 8(a), block interpolation is performed for the last three symbols (a sixth symbol of a reference slot and first and second symbols of next slot) based on the reference symbols. Similarly, in group 4, block interpolation is performed for first two symbols (a first symbol of a reference slot and a sixth symbol of a previous slot) based on the reference symbols. Likewise, block interpolation may be applied to the other groups and groups of a reference signal hopping pattern 1 shown in FIG. 8(b). Alternatively, channel estimation performance may be improved through linear interpolation and non-linear interpolation.

The embodiment 2 is an example of the reference signal hopping pattern, and corresponds to another pattern that uses all of the maximum number of reference symbols in each group while allowing the reference symbols not to be overlapped, in another way.

Proposed Method 2: Non-Orthogonal Multiple Access UE Group for Massive Connectivity To perform the above-described reference signal hopping method for massive connectivity, definition and signaling of a UE grouping method of a non-orthogonal multiple access system are required.

The UE grouping method of the non-orthogonal multiple access system for performing the reference signal hopping method suggested in the reference signal hopping method for massive connectivity is suggested. In the reference signal hopping method for massive connectivity, a reference signal hopping method according to UE group has difference in demodulation performance between groups. Since reference signals of group 1 can be received without interference, channel estimation performance can be ensured, and better received performance may be expected due to differential interference of each data symbol. For example, the third symbol of group 1 in FIG. 5 has only interference from the reference symbols of group 2, and the reference symbol is information previously known, and has excellent interference cancellation performance. On the other hand, since the fifth symbol of group 2 has interference from data symbols of group 1 and interference from reference symbols of group 3, demodulation performance may be reduced. Even though iterative multi-group detection is performed, it is expected that demodulation performance is reduced in case of group having much interference. Therefore, a higher group (for example, group 1 is the most significant group) has excellent received demodulation performance, whereby data transmission may be performed at a higher MCS (Modulation and Coding Scheme) level, and a higher data rate may be expected even though the same resource is allocated. On the other hand, a lower group (for example, group 5 is the least significant group) has low received demodulation performance, whereby data transmission should be performed at a low MCS level.

Also, the higher group may transmit more data symbols, and the lower group should transmit less data symbols than those of the higher group due to usage of null symbol for reference symbol detection of the higher group. Therefore, UE scheduling and UE grouping is required considering MCS level between groups and a data transmission rate that may be provided.

Group Grouping Method 1

A base station (BS) may allocate a UE having much transmission traffic based on a required data transmission rate and a scheduling request (SR) of a UE to a higher group and allocate a UE having less transmission traffic to a lower group. In this case, the UE may transmit the amount of transmission traffic to the BS through a data channel (e.g., physical uplink shared channel (PUSCH)) by being included in a buffer status report (BSR), whereby the BS may recognize the amount of traffic. The BSR may be transmitted as a regular BSR, periodic BSR or padding BSR.

Group Grouping Method 2

The BS may configure UEs having a similar timing distance as a group in accordance with a timing distance of a UE. The timing distance may be determined in accordance with a propagation delay based on a multi-path of the UE or system environment as well as a physical distance. At this time, a UE group having a long timing distance may be allocated as a higher group to ensure a data transmission rate.

Group Grouping Method 3

The BS may group UEs on the basis of UE fairness index. Users having low UE fairness index may be allocated to a higher group to ensure fairness. At this time, fairness index may be determined based on the existing proportional fairness, or may be defined through other fairness indexes. For example, various indexes such as Jain's Fairness index and Max-min Fairness may be used. If the group grouping method suggested in the present invention is used, UE grouping fairness of the non-orthogonal multiple access system may be supported.

Hereinafter, a procedure of processing the above-described reference signal hopping pattern invention 1 for massive connectivity and UE grouping information exchange will be described.

Figure 9:
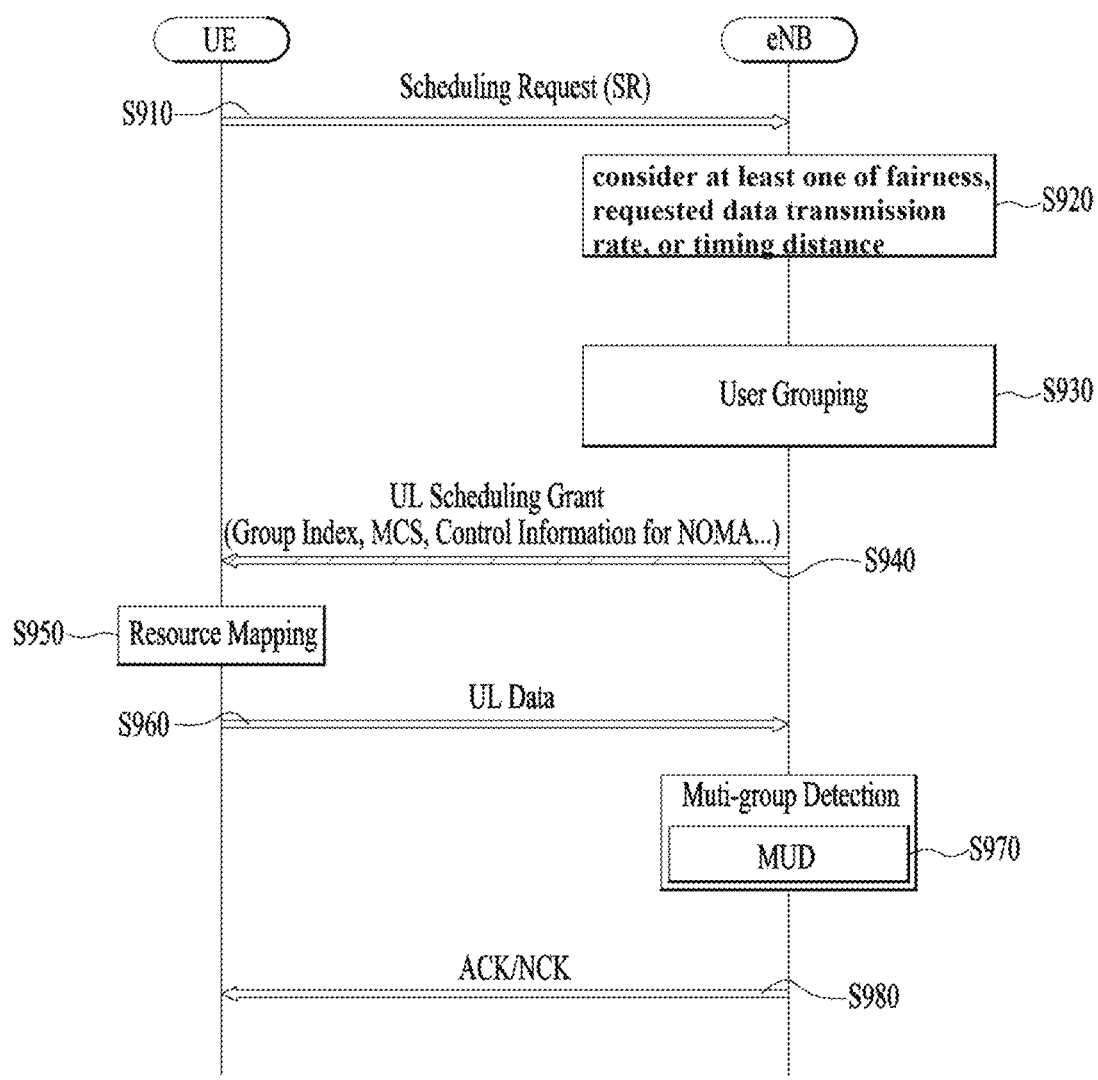
FIG. 9 is an exemplary view illustrating a procedure for massive sporadic packet services.

FIG. 9 is an exemplary view illustrating a procedure for massive sporadic packet services.

A structure of a non-orthogonal multi-group multiple access system is illustrated in FIG. 9. The UE may deliver its uplink traffic transmission request to the BS (eNB) through a scheduling request (SR) signal (S910). The BS may perform scheduling based on the above-described group grouping methods (e.g., group grouping methods 1, 2 and 3) on the basis of a channel environment of a UE and a state of another UE (S920). The BS performs UE grouping on the basis of at least one of the above-described group grouping methods (e.g., group grouping methods 1, 2 and 3)

(S930). If a non-orthogonal t7 multiple access group of the UE is determined, the BS may transmit group indexes and control information (e.g., power allocation information for MUST or codebook index for SCMA, interleaver index for IDMA, etc.), MCS level, etc. to the UE through an uplink scheduling grant (e.g., UL grant) of a control channel (e.g., physical downlink control channel (PDCCH)) unlike the legacy system (S940). In this case, the reference signal hopping pattern previously may be defined cell-specifically, or the BS may notify the UE of a reference signal hopping pattern index by including the reference signal hopping pattern in the UL grant. Also, the MCS level may be defined in a unit of group, or may be determined user-specifically.

The UE may transmit uplink data to the BS by mapping the data symbols and the reference symbols into resources on the basis of the group index included in the UL grant and resource allocation information (S950 and S960). The BS performs iterative demodulation for multi-groups and demodulates signals of multi-group multi-UEs by performing MUD in demodulation of each group (S970). The BS transmits an ACK or NACK feedback signal to the UE on the basis of the demodulated signals (S980).

Through the proposed methods 1 and 2, it is able to perform a non-orthogonal multi-group multiple access capable of demodulation while supporting the maximum number or more of sequence-based reference symbols. Although a transmitting principal and a receiving principal are described as a user and a base station on the basis of uplink in the present invention, respectively, they are applicable to fit the disposition of Downlink (DL) PDSCH and cell-specific RS. And, Partially Overlapping Multiple Access (POMA) is named and described as a sort of NIMA in the present invention.

The existing POMA is a scheduling based MA technique that operates in a manner that a UE receives a grant from a base station. In an environment (mMTC) having high connectivity that requires POMA, a contention based MA technique can be considered. For example, since an mMTC UE requires high connectivity and low energy consumption, initial control signaling for data transmission may cause considerable overhead in comparison to data transmission. Therefore, it is necessary to support contention based MA capable of performing data transmission and reception without a grant. Contention based POMA is proposed as follows.

The present invention assumes a contention based transmission environment. Here, a contention based transmission assumes a state of obtaining DL synchronization through an initial access, receiving common control information and performing an RACH procedure and RRC connection. A UE assumes RRC_CONNECTED state. In addition, in RRC_IDLE state of a UE, it can operate on the basis of information of the latest RRC_CONNECTED. Therefore, each UE assumes a situation of obtaining C-RNTI or a situation of neither requesting nor receiving a grant for a UL transmission.

In the contention based transmission environment, each UE needs the following determinations for contention based POMA.

(1) Determination of a physical resource for contention based POMA (2) Group indication for contention based POMA (3) Determination of a reference signal for contention based POMA (4) Determination of a data encoding scheme for contention based POMA (5) Determination of a transmission scheme for contention based POMA (6) Determination of a UE detection scheme of a receiving side for contention based POMA Determination of each of the six schemes listed in the above may be used, according to a system environment, in a fixed manner or determined in a random manner by a transmitting side. In case of using the determination in a fixed manner, although complexity of a detection/decoding scheme of a receiving side is lowered, a base station transmits common information on the corresponding scheme or the determination should be fixedly defined in a system. On the other hand, if the determination is made by the transmitting side in a random manner, although complexity of a detection/decoding scheme of the receiving side is raised, the transmission of common information on the corresponding scheme is reduced and collision of UE's data transmission can be decreased according to a traffic situation. Definitions and operating methods for the above-listed six schemes are proposed in the following.

(1) Physical Resource Determination Scheme for Contention Based POMA

A physical resource for contention based POMA may be defined in advance through common control information. A UE that performs contention based POMA is assumed as receiving system information after obtaining DL synchronization. A base station can broadcast information on a contention based POMA zone to the entire UEs through common control information. Here, the contention based POMA zone may exist as a physical resource periodically or aperiodically. A UE can transmit data through the contention based POMA zone at a traffic generated timing. The physical resource may include a frequency/time resource block (e.g., Physical Resource Block (PRB) as well as a single frequency/time resource.

(2) Scheme of Determining Group Indication for Contention Based POMA

Group indication for contention based POMA may be defined in advance through common control information. A UE performing contention based POMA is assumed as receiving system information after obtaining DL synchronization. A base station can broadcast information related to a lookup table for group selection to the entire UEs through common control information. Here, the lookup table for group selection can be defined by higher layer signaling (e.g., RRC signaling). For example, a group selection can be made by a higher layer priority (e.g., a service class) of data to be transmitted. Assuming that 6 groups are defined by POMA like Table 1, a UE generates a traffic and is then able to select a group from a lookup table through higher layer signaling for the generated traffic.

TABLE 1

| Higher Layer Service Class | Priority Level | POMA Group Selection |
|---|---|---|
| Class 1 | Priority 1 | Group 1 |
| Class 2 | Priority 2 | Group 2 |
| Class 3 | Priority 3 | Group 3 |
| Class 4 | Priority 4 | Group 4 |
| Class 5 | Priority 5 | Group 5 |
| Class 6 | Priority 6 | Group 6 |

A UE can determine a priority level based on a higher layer service class without a reception of a grant from a base station and select a group to perform POMA. Although a service class, a priority level and a group selection are mapped by 1:1 in the example shown in Table 1, N:1 mapping or 1:N mapping can be performed as well. Here, a priority of data is defined not on a physical layer but on a higher layer (e.g., an application layer). After the defined priority has been confirmed with a cross layer, it is utilized for a group selection in case of a data transmission of a physical layer.

Figure 10:
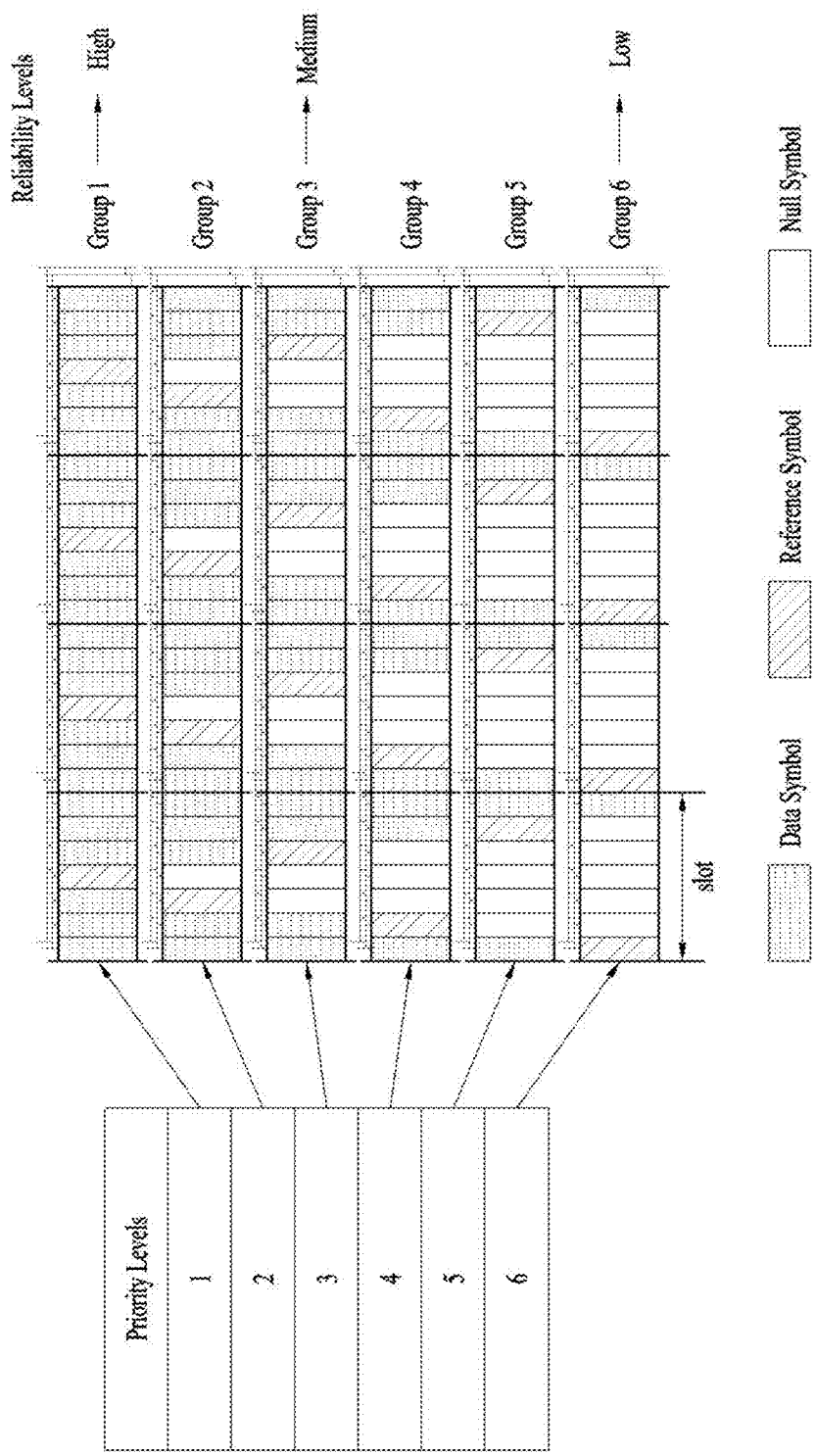
FIG. 10 is a diagram exemplarily showing a priority level and a reliability level for a group in a POMA environment.

FIG. 10 is a diagram exemplarily showing a priority level and a reliability level for a group in a POMA environment.

Priority 1 is a higher layer data having the highest importance, and a UE needs to transmit the data using many resources. Regarding an operation of POMA, since Group 1 can utilize the most resources, it is able to configure physical data with many repetitions or at a low code rate despite transmitting the same information amount. Therefore, physical data corresponding to Priority 1 can provide higher reliability. On the other hand, a group of a low priority transmits data of a low reliability level in comparison with a group of a high priority.

(3) Scheme of Determining a Reference Signal for Contention Based POMA

When each UE transmits data in the above-described contention based POMA zone, a reference signal for channel estimation is defined. In case of contention based POMA, since a UE does not receive a grant for data transmission from a base station, the UE should select and transmit a reference signal. Here, the selection of the reference signal means to select a signal for channel estimation of UE's data transmission in a whole set of reference signals based on Frequency Division Multiplexing/Code Division Multiplexing/Time Division Multiplexing (FDM/CDM/TDM) or the like. In doing so, Time Division Multiplexing (TDM) of a reference signal can be determined by a group selection in the scheme of determining a group indication for the contention based POMA. For example, if Group 2 is selected, as shown in FIG. 10, a UE transmits a reference signal in a third symbol among 7 symbols within a single slot. Moreover, assume that there exist 12 DMRS sequences usable in a single contention based data transmission zone by Cyclic Shift (CS) or Orthogonal Code Cover (OCC) in a system that uses a DeModulation Reference Signal (DMRS) sequence as a Zadoff-Chu sequence (herein, descriptions of a definition for DMRS by cell ID and a definition of DMRS for multiple antennas on the basis of an operation within a single cell are excluded). If so, the UE randomly selects 1 DMRS sequence from the 12 DMRS sequences. Here, if the UE considers transmission for a multitude of layers, it is able to randomly select a multitude of DMRS sequences.

(4) Data Encoding Scheme Determination for Contention Based POMA

Regarding POMA, since an amount of physical resources usable for data transmission may differ according to a group, a data encoding operation of a UE may appear differently depending on a group selection. For example, POMA Group 1 of a high group can use 6 symbols for data transmission but POMA Group 6 of a low group can use 1 symbol for data transmission. Hence, a UE may control MCS according to a reliability level or a target bit rate.

(4)-1: MCS Control of Each Group According to Reliability Change

For an operation of contention based POMA, a base station can designate to indicate data encoding of each group like Table 2 as one example through common control signaling (e.g., system information broadcasting).

TABLE 2

| POMA Group Selection | MCS | Repetition |
| --- | --- | --- |
| Group 1 | QPSK, 1/4 Channel coding | 6 |
| Group 2 | QPSK, 1/4 Channel coding | 5 |
| Group 3 | QPSK, 1/4 Channel coding | 4 |
| Group 4 | QPSK, 1/4 Channel coding | 3 |
| Group 5 | QPSK, 1/4 Channel coding | 2 |
| Group 6 | QPSK, 1/4 Channel coding | 1 |

Although all groups use the same MCS like Table 2, a higher group can provide higher reliability through more symbol level repetitions or bit level repetitions.

Alternatively, as shown in Table 3, all groups can use different MCS despite the same symbol or bit level repetition. Particularly, a higher group can provide higher reliability through a lower code rate.

TABLE 3

| POMA Group Selection | MCS | Repetition |
| --- | --- | --- |
| Group 1 | QPSK, 1/24 Channel coding | 1 |
| Group 2 | QPSK, 1/20 Channel coding | 1 |
| Group 3 | QPSK, 1/16 Channel coding | 1 |
| Group 4 | QPSK, 1/12 Channel coding | 1 |
| Group 5 | QPSK, 1/8 Channel coding | 1 |
| Group 6 | QPSK, 1/4 Channel coding | 1 |

The above operation can be defined in advance in the same manner through a modulation order change. Modulation order information corresponding per group can be periodically broadcasted by a base station to all UEs through System Information Block (SIB). Although flexibility exists in reliability, there is no inter-group difference in aspect of a bit rate.

(4)-2: MCS Control of Each Group According to Target Bit Rate Change

For an operation of contention based POMA, a base station can designate data encoding of each group like through common control signaling (e.g., system information broadcasting). For example, although all groups use the same MCS like Table 4, a higher group can provide a higher bit rate. Here, in Table 4, 'A' is an example of a data rate definable by a physical resource and can be defined in bps unit.

TABLE 4

| POMA Group Selection | MCS | Target bit rate |
| --- | --- | --- |
| Group 1 | QPSK, 1/4 Channel coding | 6A |
| Group 2 | QPSK, 1/4 Channel coding | 5A |
| Group 3 | QPSK, 1/4 Channel coding | 4A |
| Group 4 | QPSK, 1/4 Channel coding | 3A |
| Group 5 | QPSK, 1/4 Channel coding | 2A |
| Group 6 | QPSK, 1/4 Channel coding | 1A |

Although flexibility exists in a bit rate, there may be no inter-group difference in aspect of reliability.

(5) Transmission Scheme Determination for Contention Based POMA

When each UE transmits data on the basis of DMRS defined in the (3) Scheme of selecting a reference signal for contention based POMA within a contention based data transmission zone defined in the (1) Physical resource determination scheme for contention based POMA based on the group selection defined in the (2) Scheme of determining group indication for contention based POMA, a data transmission scheme is defined. Here, the data transmission scheme includes a selection scheme for a multitude of contention resources within a contention based POMA zone. The contention resources may include a variety of time, frequency, codeword (or sequence), power, scrambling, interleaver, spatial resource and the like. In case of contention based POMA, since a UE does not receive a grant for data transmission from a base station, the UE should select a resource for the data transmission from contention resources and then transmit data on the selected resource. For example, assume that 12 codeword resources exist in a state that resource such as time, frequency and the like are shared within a single contention zone. If so, a UE can perform data transmission by randomly selecting a codeword from the 12 codeword resources. Here, regarding the codeword, as data is transmitted with a different codeword on the same physical resource within the same contention zone, a receiving side detects and decodes the data transmitted with each code.

A selection of a contention resource (e.g., the selection of the codeword in the above example) can be made in association with a DMRS sequence of a UE. For example, assuming that a maximum DMRS index value (Maximum DMRS_INDEX) is a maximum codeword index value (Maximum Codeword_INDEX), a DMRS sequence and a contention resource can be mapped by 1:1. For example, if a codeword index (Codeword_INDEX) is equal to a DMRS index, if the maximum number of codewords is 12, if the maximum number of DMRSs is 12, when a value of a DMRS index (DMRS_INDEX) is 1, a value of a codeword index is 1 as well. In case of the above application, if DMRS sequence collision does not occur by multiple users, codeword collision does not occur as well. Moreover, a receiving side can perform data decoding based on a mapped codeword without blind detection.

In case that a DMRS sequence and a contention resource are not mapped to each other, a receiving side should perform blind detection of a codeword for data decoding additionally after blind detection of DMRS. Moreover, even if DMRS sequence collision does not occur, codeword collision may occur. In this case, although channel estimation is normally performed, performance of MUD on a receiving side may not be secured due to codeword collision.

Or, even if DMRS sequence collision occurs, codeword collision may not occur. In this case, MUD may be possible owing to a use of a different codeword, as channel estimation is not performed normally, MUD performance of a receiving side may not be secured due to codeword collision.

Moreover, since a collision probability of DMRS and a collision probability of a codeword work independently, a total collision probability may increase. For example, if a DMRS sequence and a contention resource are mapped to each other, a probability that both DMRS collision and codeword collision do not occur in a contention based transmission of two UEs in the above example is 11/12. On the other hand, if a DMRS sequence and a contention resource are not mapped to each other, a probability that both DMRS collision and codeword collision do not occur is 121/144. Hence, when any one of DMRS collision and codeword collision does not occur, a mapping scheme of a DMRS sequence and a contention resource is advantageous in collision probability in an environment that decoding performance for enabling MUD is not secured.

On the other hand, when any one of DMRS collision and codeword collision does not occur, a mapping of a DMRS sequence and a contention resource may not be assumed in an environment that decoding performance for enabling MUD is not secured (i.e., a MUD performance secured environment). For example, in case that a DMRS sequence and a contention resource are mapped to each other, a probability that both a DMRS collision and a codeword collision occur in a contention based transmission of two UEs in the above example is 1/12. On the other hand, if a DMRS sequence and a contention resource are not mapped to each other, a probability that both a DMRS collision and a codeword collision occur is 1/144. Hence, in an environment that MUD performance is secured and that a blind detection complexity of a receiving side is accepted, a DMRS sequence and a contention resource are not mapped and a codeword index can be randomly selected by a transmitting side.

(6) UE Detection Scheme of a Receiving Side for Contention Based POMA

Since it is not a grant based data transmission in contention based POMA, as a receiving side performs blind detection, it is necessary to define a blind detection processing procedure. Since a location of DMRS is different according to a group in contention based POMA, a receiving side performs DMRS blind detection of a higher group. For example, (1) a receiving side performs blind detection on 12 DMRSs at a DMRS location corresponding to Group 1. (2-1) If a DMRS corresponding to Group 1 is detected, the receiving side performs group detection. The receiving side regenerates detected data of Group 1 from DMRS detection of Group 2 based on the group detection result, thereby performing interference cancellation. (2-2) If a DMRS corresponding to Group 1 is not detected, the receiving side performs DMRS detection corresponding to Group 2 without performing group detection for Group 1. The receiving side repeatedly performs the above operations in order of a higher group to a lower group.

Although all the above schemes are described regarding the contention based transmission, they can apply to the scheduling based transmission in the same manner. For example, a DMRS of a UE can be selected by a modulo operation with C-RNTI. If so, it is able to reduce overhead for a grant by skipping a transmission of grant information on the DMRS. In this case, a receiving side (e.g., a base station) needs to perform scheduling in consideration of UE's DMRS selection. Likewise, a codeword of a UE can be determined on the basis of DMRS selection. If so, it is able to reduce overhead for a grant by skipping a transmission of grant information on the codeword. In this case, a base station needs to perform scheduling in consideration of UE's codeword.

All the above schemes can become group scheduling on the basis of feedback for a priority in a scheduling based transmission. For example, a UE can transmit a Scheduling Request (SR) by inserting a preference or priority field for UL traffic in UL control information or UL data. In this case, a base station can perform scheduling of designating a group based on the priority information fed back from the UE and transmit a grant such as group designation information and the like to the UE through DCI.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

A method of performing a contention-based non-orthogonal multiple access in a wireless communication system and apparatus therefor are industrially applicable to various wireless communication systems such as 3GPP LTE/LTE-A, next generation 5G communication system and the like.

What is claimed is:

1. A method of performing a contention-based non-orthogonal multiple access by a user equipment in a wireless communication system, the method comprising:
   selecting a corresponding group from a plurality of groups for the non-orthogonal multiple access based on a service class on a higher layer;
   transmitting a reference signal to which a reference signal sequence selected from a plurality of reference signal sequences is applied on a reference signal resource allocated to the selected corresponding group; and
   transmitting data encoded in a manner of applying a repetition count or target bit rate corresponding to the selected corresponding group to the data.

2. The method of claim 1, wherein the data is transmitted on a dedicated resource configured for the contention-based non-orthogonal multiple access.

3. The method of claim 2, further comprising receiving information on the dedicated resource configured for the contention-based non-orthogonal multiple access.

4. The method of claim 2, wherein if the group selected by the user equipment has a priority higher than that of a different group, a data region allocated to the selected group in the dedicated resource is bigger than a data region allocated to the different group.

5. The method of claim 1, further comprising receiving information indicating matching relationship between service classes on the higher layer and a plurality of the groups.

6. The method of claim 1, wherein the service class is determined based on a priority of the data on the higher layer.

7. The method of claim 1, wherein the data is transmitted through a data region allocated to the selected group in the dedicated resource.

8. The method of claim 1, wherein the contention-based non-orthogonal multiple access includes Partially Overlapping Multiple Access (POMA).

9. A user equipment performing a contention-based non-orthogonal multiple access in a wireless communication system, the user equipment comprising:
   a processor configured to select a corresponding group from a plurality of groups for the non-orthogonal multiple access based on a service class on a higher layer; and
   a transmitter configured to transmit a reference signal to which a reference signal sequence selected from a plurality of reference signal sequences is applied on a reference signal resource allocated to the selected corresponding group and transmit data encoded in a manner of applying a repetition count or target bit rate corresponding to the selected corresponding group to the data.

10. The user equipment of claim 9, further comprising a receiver configured to receive information indicating matching relationship between service classes on the higher layer and a plurality of the groups.

11. The user equipment of claim 10, further comprising a receiver configured to receive information on a dedicated resource configured for the contention-based non-orthogonal multiple access.

12. The user equipment of claim 10, wherein if the group selected by the user equipment has a priority higher than that of a different group, a data region allocated to the selected group in the dedicated resource is bigger than a data region allocated to the different group.

13. The user equipment of claim 9, wherein the service class is determined based on a priority of the data on the higher layer.

14. The user equipment of claim 9, wherein the transmitter transmits the data on a dedicated resource configured for the contention-based non-orthogonal multiple access.

15. The user equipment of claim 9, wherein the contention-based non-orthogonal multiple access includes Partially Overlapping Multiple Access (POMA).

* * * * *